United States Patent [19]

Campbell, Jr. et al.

[11] Patent Number: 5,195,151
[45] Date of Patent: Mar. 16, 1993

[54] OPTICAL FIBER COUPLERS AND METHODS OF THEIR MANUFACTURE

[75] Inventors: Daniel R. Campbell, Jr.; David W. Stowe, both of Medfield, Mass.

[73] Assignee: Aster Corporation, Milford, Mass.

[21] Appl. No.: 628,597

[22] Filed: Dec. 17, 1990

[51] Int. Cl.[5] .............................................. G02B 6/26
[52] U.S. Cl. ...................................... 385/43; 385/42; 65/4.1
[58] Field of Search ................... 350/96.15, 96.16, 320, 350/96.29; 65/4.1, 4.2, 4.3; 385/27–29, 39, 42, 43

[56] References Cited

U.S. PATENT DOCUMENTS

| | | | |
|---|---|---|---|
| 4,763,977 | 8/1988 | Kawasaki et al. | 350/96.15 |
| 4,798,436 | 1/1989 | Mortimore | 350/96.15 |
| 4,822,126 | 4/1989 | Sweeny et al. | 385/43 |
| 4,895,423 | 1/1990 | Bilodeau et al. | 350/96.15 |
| 4,900,119 | 2/1990 | Hill et al. | 350/96.15 |
| 5,004,316 | 4/1991 | Hill et al. | 350/96.15 |
| 5,054,874 | 10/1991 | Hill et al. | 385/28 |

FOREIGN PATENT DOCUMENTS 0293289 11/1988 European Pat. Off.
PCT/WO87/ 00934 2/1987 World Int. Prop. O.

OTHER PUBLICATIONS

D. B. Mortimore, "Wavelength-Flattened Fused Couplers", Electron. Letter, 21, 742, 1985.
F. Bilodeau, et al., "Compact, low-loss, fused biconical taper couplers: overcoupled operation and antisymmetric supermode cutoff", Optics Letters, vol. 12, No. 8, Aug. 1987, pp. 634–636.
D. B. Mortimore, "Theory and fabrication of 4×4 single-mode fused optical fiber couplers", Applied Optics, vol. 29, No. 3, Jan. 20, 1990, pp. 371–374.
D. B. Mortimore, "Monolithic Wavelength-Flattened 1×7 Single-Mode Fused Coupler", Electronics Letter, vol. 25, No. 9, Apr. 1989.

Primary Examiner—John D. Lee
Assistant Examiner—S. W. Barns
Attorney, Agent, or Firm—Fish & Richardson

[57] ABSTRACT

Fiber optic couplers formed of at least two single mode optical fibers, at least one of which is an input fiber, are shown, the fibers constructed and arranged in the manner that coupling between the input fiber and the other fibers limits antisymmetric modal energy to substantially less than 50% of the input energy, the coupling region of said coupler being fused and drawn to an extended length sufficient to cause cutoff of the antisymmetric mode energy, whereby the coupler exhibits coupling ratio stability over an extended range of wavelengths and an excess loss of substantially less than 50%. Numerous fiber couplers of various construction, all employing cut-off of the antisymmetric mode to achieve wideband response or wavelength insensitivity are shown along with their method of manufacture.

16 Claims, 12 Drawing Sheets

OPTICAL FIBER COUPLERS AND METHODS OF THEIR MANUFACTURE

FIELD OF THE INVENTION

The invention relates to achieving practical fiber optic couplers for single mode fibers that have improved constancy of coupler performance.

BACKGROUND OF THE INVENTION

Fiber optic systems feature fiberoptic splitters or couplers as a means to branch optical power into more than one fiber waveguide. Often it is desired to couple optical power from a common bus fiber into many side branches. Taps are located serially along the length of the bus fiber, each tap providing only a small fraction of the total power carried on the bus for use by attached equipment The optical power budget of such a system typically interrelates with the amount of loss of optical power that can be tolerated at each tap point. Since the power available at each tap point depends upon the total power remaining in the bus fiber at that point, system designs critically depend on the splitting ratio of each coupler being sufficiently constant over the entire optical wavelength band of sources usable in the system. Additionally, the coupling ratio must be sufficiently constant in coupling ratio with respect to changes in temperature, physical stress and input optical polarization.

Typically, conventional couplers made by the familiar technique of fused tapering, exhibit acceptably low loss, but the coupling ratio depends on the wavelength of light passing through the coupler. Since the wavelength of optical sources can vary over considerable ranges, and since it often is necessary to use more than one optical wavelength in a system, it is highly desirable to use couplers which exhibit reduced sensitivity of coupling ratio to optical wavelength. Couplers having a nominally constant coupling ratio over the wavelength band of interest are referred to as wideband couplers, wavelength flattened couplers, wavelength independent couplers, broad-band couplers, etc. By using couplers that have a sufficient constancy over a sufficient band width, with acceptable excess loss, and sufficient constancy in performance with changes in the temperature and stress environment, systems can be provided for working over a design range of wavelengths and environmental conditions. It follows that improvement in the constancy of coupling ratio while keeping excess loss within acceptable limits can lead to important improvement in the performance and lower cost for many optical systems.

Heretofore, wideband couplers have been made by preselection of the difference in propagation constant of the constituent fibers relative to the desired coupling ratio. In this manner the first maximum, a relatively flat portion of the coupling ratio curve that oscillates during drawing of the coupler, can be made to coincide with the coupling ratio desired. The coupling performance of the resulting coupler can be relatively constant due to operating with the flat portion of the coupling ratio curve that occurs at maxima. Fibers having such preselected, different propagation constants, e.g., can be fused together in a manner to achieve identical coupling at two wavelengths by selection of the stopping point during fusing/drawing of the fibers, either by observing the varying coupling ratios or selecting manufacturing parameters that have been predetermined to produce the desired ratio. This method is most useful in a two wavelength system where both wavelengths are well known in advance. One of the fibers of different propagation constants can e.g. be powered by the two wavelengths while the fibers are fused by thermal drawing. Drawing is stopped as soon as the desired coupling ratio at wavelengths is observed. The coupling ratio in such cases is the result of the amount and nature (constructive) of the interference between the symmetric and antisymmetric modes in each of which substantial energy is propagating in the coupler. For this discussion we shall refer to couplers made from fibers of different propagation constant drawn to an early occurrence of the desired coupling ratio as "short-draw Delta-B" type wideband couplers.

A difference in propagation constant of two fibers is acquired in many ways. In one approach identical fibers are processed to have different diameters, e.g., by drawing one fiber into a tapered section of reduced diameter relative to the other fiber. The tapered section is then fused with an unprocessed fiber or with a fiber that was tapered more or less than the first fiber. Different propagation constants can also be obtained by etching one or both fibers so that their diameters are different before fusion or by selecting fibers with different V numbers.

Couplers made in this manner, whose coupling ratio is dependent upon interference between symmetric and antisymmetric modes, typically demonstrate fairly low excess losses but often exhibit coupling ratio variations of $+/-9\%$ or more over about a 300 nanometer optical wavelength range. This degree of coupling variation can account for significant cumulative errors in system power budget when many such couplers are used as serial taps.

As a variation of the short-draw Delta-B method, wavelength response flattening has also been achieved by fusing fibers that have different core refractive indices. Again, the desired coupling ratio is dependent upon the degree of interference between the symmetric and antisymmetric modes in which the energy of the coupler propagates. The utility of such a coupler may in some cases be limited by the presence of dissimilar glasses. E.g., splicing of fibers with differing indices into a system bus fiber creates cumulative splicing loss variations that may prove intolerable to system designers. Additionally, in manufacturing, quality control of two different fibers may be more costly than control of a single type of fiber.

In an experiment that has been reported, wavelength insensitivity has been obtained by drawing two identical fibers over a much greater distance than used in other approaches, until a different phenomenon occurs (see Bilodeau et al., "Compact, low loss, fused biconical taper couplers: overcoupled operation and antisymmetric supermode cut off," Optic Letters, Vol. 12, No. 8, 1987). Herein this method is referred to as the "extended-draw" method. As the fibers are fused and progressively drawn, the coupling between the two fibers oscillates. This is a common observation to anyone skilled in the art of coupler fabrication. (see also Bilodeau et al, Fabrication Technique for Low-Loss Fused Taper Directional Couplers and Pressure Sensor Produced Thereby, U.S. Pat. No. 4,895,423, Jan., 1990.) In this latter reference it is reported that by halting the drawing of the the coupler after several hundred to several thousand cycles of the coupling ratio, the coupler becomes increasingly sensitive to perturbations of the optical media, e.g., by temperature or pressure variations at the coupling region. A coupler operating in the region of rapid coupling oscillation relative to draw length experiences increasingly sensitive interference between the symmetric and antisymmetric modes guided by the coupling region and becomes a suitable means for sensing environmental phenomena but certainly not suitable for communication network applications.

However, as reported in the former reference, if the drawing process is continued long enough to cause oscillation through many cycles, eventually the variation of coupling ratio has been found to cease and the coupling ratio stabilizes at about 50%, attributed to cut-off of the antisymmetric mode of energy propagation. The coupling ratio obtained then typically varies within $+/-2\%$ over the wavelength range, an attractive characteristic.

However, using the extended-draw method reported, optical power loss of about 50% was observed by the authors. Even if such excess loss might be tolerable in a few applications, the majority of communications systems designs cannot of course tolerate the repeated loss of half the system optical power at each splitting point.

As another part of the background of the present invention, in many applications, it is often necessary to branch one optical fiber into more than two outputs. Couplers which perform this branching are often referred to as star couplers. Star couplers can be made by fusing more than two fibers in a common fused region. A star coupler of this type intrinsically has an equal number of input and output fibers. In a single optical wavelength system application, typically only one of the fibers is used as the input. If more than one wavelength is used in the system, each separate wavelength may be input on a different optical fiber. The action of the coupler is to split the sum of optical power in each input fiber into more or less equal fractions of the input sum in each output fiber. E.g., if three optical inputs P1, P2, P3 are used in a $3\times3$ star coupler, each output fiber might carry output power equal to $(P1+P2+P3)/3$, neglecting excess loss. In general, star couplers are designated as $N\times N$ or $1\times N$ couplers, N denoting the number of fused fibers.

To make a star coupler, a preferred method of prior art teachings disposes six fibers around a central fiber. All seven of these fibers have substantially identical diameters. So doing provides optimum coupling uniformity. Such a coupler is drawn until the coupling ratios, as measured by the amounts of optical power carried in each output fiber, is essentially equal among all the fibers. This method can yield good coupling uniformity, low excess loss, and a degree of wideband behavior based on the principles noted above with regard to short draw couplers. The method is however limited to the fabrication of $1\times6$ and $1\times7$ port couplers. Most systems designs require $1\times4$ and $1\times8$ port configurations.

Another method of performing branching into many fibers requires the fabrication of a tree structure using a collection of $2\times2$ couplers. The two outputs of a first $2\times2$ coupler are spliced to the input fibers of two more $2\times2$ couplers. The four outputs of these two couplers are spliced to the inputs of four more $2\times2$ couplers. Thus, a tree of seven $2\times2$ couplers provides two inputs and eight outputs. The fabrication of tree structures is, in principle simple, but coupling ratio variations among the couplers and splicing losses between couplers accumulate to cause wide variations in the fraction of input light present in each output. Couplers chosen for tree fabrication must be exceptionally accurate and stable, and the splicing procedure must be quite precise and repeatable.

Considering the cumulative optical power loss in a tree coupler, using extended-draw wideband couplers for such fabrication is not realistic. Alternatively, since the wavelength dependent coupling ratio variation of short-draw Delta-B couplers ranges around $+/-9\%$, very careful selection of short-draw Delta-B couplers is required if these couplers are to be used in a tree and the results are often not as good as desired.

In systems designs requiring star type couplers three parameters characterizing the couplers are important: 1) the "uniformity" of the coupling ratio describes the degree to which each of the N outputs carries essentially 1/N of the total output power; 2) the constancy of the coupling ratio with respect to wavelength; and, 3) the excess loss. Prior art has emphasized the importance of uniformity. In applications requiring equal splits of optical power, e.g., a bus which is split into eight equally tapped branches, uniformity is a critical parameter.

On the other hand, many distribution systems need to split the optical power from a central source into many legs of unequal length, or into legs which will service different numbers of serial user taps. In this case it is wasteful of optical power to split the bus uniformly. The legs which support fewer serial taps require less optical power than those that support many taps. What is needed, therefore is a wideband star coupler providing a selection of splitting ratios appropriate to serve a range of branch tap requirements. In this case, the uniformity is not critical, but the constancy of coupling to each output with respect to wavelength and environmental conditions is critical. Excess loss may or may not be of critical importance depending on the system requirements.

The prior art has not shown a favorable way to produce $2\times2$ couplers which possess the combined features of coupling any amount of optical power from 0 to 30%, low loss, and truly flat response over the 1200 to 1600 nm range of typical optical power sources. Similarly, prior art has not shown an economical method to fabricate wideband star couplers in $1\times4$ and $1\times8$ port configurations. Further, prior art has not addressed the need for non-uniform wideband couplers having $1\times N$ and $N\times N$ port configurations.

The present invention addresses the various needs described above and provides improved, practical fiber optic couplers, splitters and similar devices.

SUMMARY OF THE INVENTION

Fiber optic couplers formed of at least two single mode optical fibers, at least one of which is an input fiber, the fibers constructed and arranged in the manner that coupling between the input fiber and the other fibers limits antisymmetric modal energy to substantially less than 50% of the input energy, the coupling region of the coupler being fused and drawn to an extended length sufficient to cause cutoff of the antisymmetric mode energy, whereby the coupler exhibits coupling ratio stability over an extended range of wavelengths and an excess loss of substantially less than 50% are disclosed.

The invention provides a fiber optic coupler comprised of fibers of differing propagation constants selected to limit the degree of excitation of the antisymmetric mode substantially below 50%, the fibers being fused together and drawn over a length exceeding the antisymmetric cut off, whereby substantially constant coupling performance is obtainable with excess loss substantially less than 50%.

In one preferred embodiment, a wideband optical fiber coupler for single mode fibers comprises a thermally fused lateral intersection of two or more optical fibers wherein in one aspect, two fibers of differing diameters are placed in lateral contact and are then heated and elongated forming a long, fused, tapered coupling region.

In a second aspect, more than two fibers of the same or different diameters are arranged in lateral contact without particular regard to radial or azimuthal symmetry and are fused and elongated forming a long, fused, tapered coupling region. Here, the coupler geometry again results in low energization of antisymmetric mode energy and resultant relatively low excess loss when drawn beyond antisymmetric mode cutoff.

In both aspects, the coupling region length is made much greater than a coupling length by drawing the fibers typically nine millimeters or more, the actual draw distance depending upon initial fiber diameters. The coupling ratio stabilizes at a substantially predetermined value which depends, in the first aspect, on the ratio of the diameter of the fibers before drawing, and in the second aspect, upon the number of fibers coupled. In both aspects, the final coupling ratio lies in the range of 1 to 30 percent and is almost independent of input optical wavelength over a range of at least 400 nanometers. Typically, the coupling ratio varies by no more than +/−1% over this wavelength range. Advantageously, this exceptional wavelength insensitivity is accompanied by excess loss as low as 0.7 dB.

Compared to couplers of prior art, which can provide either coupling ratio flatness of +/−9% and fairly low excess loss, or coupling ratio flatness of +/−2% and excess loss of 50%, the invention advantageously provides coupling ratio flatness of less than +/−1% and simultaneously improves the excess loss to less than 15%.(0.7 dB). Further, unlike prior art, couplers of the invention can be made to have any coupling ratio between 0 and 30% while still exhibiting low loss and wavelength insensitivity.

Additionally 2×2 couplers of the first aspect and N×N couplers of the second aspect demonstrate stability of coupling ratio with respect to input optical polarization, environmental temperature, and mechanical stress.

Unlike couplers of prior art, couplers of the first aspect of the invention are made using fibers of different diameters which are drawn until the coupling ratio stabilizes at a predetermined final value. The diameter difference is believed to minimize the amount of optical power coupled in the first higher order antisymmetric waveguide mode. Thus, drawing fibers of different diameter until the higher order antisymmetric mode is extinguished results in lower excess loss than drawing fibers of identical diameter. Experimentally this belief is supported by observation that in couplers of the invention, as the difference in diameters of the two fibers is increased, both the excess loss and final coupling ratio decrease.

A method of making an extended bandwidth single-mode optical fiber coupler of the first aspect of the invention comprises arranging two fibers of differing diameters so that they contact each other along some lateral extent within a relatively short region within the continuous extent of the original fiber. Both of the fibers are then heated in the region of lateral contact and elongated by drawing, forming a fused tapered coupling region. In this method, one fiber, the throughput fiber, is typically attached to an optical source. The outputs of both the throughput fiber and the coupled fiber are monitored during the drawing process. As the fibers are drawn, coupling begins to occur and can be observed by a steady growth of optical power in the coupled fiber. Light is coupled from the throughput fiber to the coupled fiber increasingly until a peak amount of the input optical power is transferred to the coupled fiber. Because the fibers have dissimilar diameters, the peak amount coupled is less than 100%. This peak transfer usually occurs within 3 to 5 millimeters of drawing, that distance depending on the initial diameters and other parameters of the fibers. After this first peak in coupling is reached, light begins to couple back into the throughput fiber. Soon, most of the light is carried by the throughput fiber once again. This oscillatory behavior continues with the distance between each peak of coupling, the so-called coupling length, decreasing as the draw length increases. Eventually, as drawing is continued through many coupling lengths, the oscillatory behavior ceases and the coupling ratio stabilizes at a predetermined value.

Fibers having different diameters, according to the first aspect of the invention, exhibit the characteristic that the final coupling ratio depends upon the diameters of the fibers before drawing. Fibers of equal diameter inherently have final coupling ratios of about 50 percent. Couplers of the invention can have predetermined values of coupling ratio in the range of 1 to 30 percent depending upon the ratio of starting diameters.

Advantageously, the coupling ratio exhibits exceptional insensitivity to input optical wavelength over a range of at least 400 nanometers. Additionally, couplers of the invention have proven to exhibit coupling ratio variations of less than 1% due to complete input polarization rotation and temperature coefficients of coupling of 0.0016% per degree centigrade.

To make a coupler of the first aspect of the invention requires fibers of different diameter. Fibers manufactured originally to have different diameters can be used. Preferably, however, since only a short region of the fibers is fused, a pair of originally identical fibers can be processed to have different diameters in a short region within the continuous extent of the coupler fiber leads. For example, at least one original fiber might be processed by etching resulting in reducing the diameter of that fiber relative to the other fiber. In another method, fibers of different diameters are made from original fibers at least one of which is heated and drawn resulting in reducing the diameter of that on fiber relative to the other. On the other hand, a combination of etching and drawing techniques is also used.

Depressed cladding fibers are best prepared by the combined etching and predrawing method just suggested. This method comprises first reducing the diameter of two fibers substantially equal amounts in regions of short length within the continuous extent of both of the fibers by etching. Subsequently, within an etched region of one of the fibers, the diameter is further reduced a predetermined amount. This may be accomplished by etching one fiber more than the other or by drawing one of etched regions to reduce its diameter.

The predetermined amount is some fraction of the diameter of the reduced region of the first fiber. This fraction is typically derived empirically and is used to predetermine the final coupling ratio. The two fibers of differing diameters are then arranged to contact each other along some lateral extent of the reduced diameter regions, e.g., by wrapping the smaller diameter fiber around the larger diameter fiber. This provides the mechanical contact necessary to ensure proper fusion. Unlike the fabrication method disclosed in U.S. Pat. No. 4,895,423, which specifically indicates that the fibers must be placed parallel and not twisted to obtain mechanical contact, the methods of the invention have proven that twisting causes no degradation in coupler performance when the drawing process is continued into the antisymmetric mode cutoff regime. In fact, twisting the fibers to obtain contact facilitates the manufacturing process. After the fibers are made to contact the fibers are then heated in the region of contact and elongated by drawing thus forming a fused tapered coupling region. The fused tapered region comprises a fused lateral intersection of two fibers of different diameters wherein optical coupling occurs. As before, drawing is continued through many beat lengths until the coupling ratio substantially stabilizes at an essentially predetermined value in the range of 1 to 30 percent.

Methods of fabricating couplers of the second aspect of the invention are substantially identical to those discussed herein above for two-fiber couplers with the exception that fibers of the same diameter may be used. Couplers of the second aspect of the invention may comprise a thermally fused lateral intersection of a group of N optical fibers of the same diameter forming a fused tapered coupling region. The coupling region length is much greater than a coupling length resulting in a predetermined coupling ratio substantially proportional to 1/N where N>2 and the coupling ratio is substantially independent of input optical wavelength over a range of at least 400 nm.

Similarly, an N×N wideband singlemode optical fiber coupler of the second aspect of the invention can comprise a thermally fused lateral intersection of a set of N optical fibers such that the fibers among the set of N fibers is further divided into at least two subsets. Each subset contains at least one fiber and each subset further comprises a group of fibers of the same diameter. Distinctively, each of the subsets comprises a number of substantially identical fibers having different diameter from the fibers in any other subset of fibers. All of the fibers of the subsets are fused to form a tapered coupling region of length much greater than a coupling length resulting in a predetermined coupling ratio substantially proportional to 1/N where N>2 and said coupling ratio is substantially independent of input optical wavelength over a range of at least 400 nm.

The invention in the second aspect advantageously provides that the grouping of fibers may be random or orderly. A random grouping of fibers is that obtained by placing any number of fibers into a bundle without particular regard to the pattern of contact achieved among the fibers. An orderly grouping, on the other hand, is obtained by carefully arranging the fibers so that specific fibers contact other specific fibers. An example of an orderly arrangement is six fibers periodically spaced about a seventh central fiber wherein all seven fibers thus disposed have the same diameter. Such an arrangement can be seen to be radially symmetric and azimuthally periodic in regard to the location of the cores of the fibers.

As a further example, nine fibers of a small diameter might be arranged in orderly fashion about a tenth central fiber of larger diameter than the surrounding fibers. This arrangement is both radially symmetric and azimuthally periodic.

As an example of a random grouping of fibers of the same diameter, eight fibers of the same diameter can be arranged in a group wherein contact is obtained by twisting or other means. In this case the eight fibers will naturally become arranged in some unpredictable, or random, pattern of contact. I.e., no two such groups will necessarily have substantially identical spacings between the cores of the fibers before or after fusing.

On the other hand, three subsets of two fibers each, wherein two fibers of 40 micron diameter, two fibers of 45 micron diameter, and two fibers of 50 micron diameter comprise the three subsets, might be arranged in random order, without regard to the pattern of contact among the fibers, and fused according to the extended drawing methods of the invention. Such a coupler would exhibit random radial and azimuthal symmetry as regards the location of the cores of the fibers about any arbitrary point in the cross-section of the fused region. Similarly, these three sets of fibers might be arranged about a central fiber so that each of the surrounding fibers contacts the central fiber. In this case, the locations of the cores of the surrounding fibers relative to the core of the central fiber do not exhibit radial symmetry but may exhibit azimuthal symmetry. Such a grouping is considered random herein.

These examples are not intended to be specifically inclusive of all possible fiber arrangements but should convey the point that fibers of the same or different diameters may be grouped in essentially any fashion within the scope of the invention.

An important feature of the invention in either aspect is that the fused coupling region is of sufficiently small diameter that it may be bent without affecting the optical properties of the coupler. Typically the extended drawing technique used here to reach stable, wavelength independent behavior results in a final diameter of the order of 1 micron in the center of the fused region. In this very thin region, the fiber is essentially an air clad fiber. The difference between core and cladding refractive indices is great and therefore the fiber in the coupling region can tolerate very small bend radii without incurring optical power loss or coupling ratio variations. This has several inapparent advantages.

First, after drawing, tension can be removed from the fused length of fiber. The thin fused region is slackened by reversing the direction of travel of the drawing stages. Typically, about 10 microns of slack is allowed in the thin fiber. Then the coupler fibers are fixed to a substrate using an appropriate adhesive, e.g., epoxy. Since the fibers are slack when glued to the substrate, stresses in the fibers due to adhesive motion are eliminated. Further, the total stress borne by the fibers during shock loads are greatly reduced. The coupler of the invention in either aspect is therefore surprisingly robust and has proven to withstand stringent industrial testing procedures with non-surpassed reliability.

Also of significant advantage during manufacturing, since the fibers in the coupling region exhibit substantial insensitivity to bending, the extreme care required to package short-draw couplers is greatly reduced.

Yet another, and perhaps even less obvious, advantage also accrues from the characteristics of the thin, air-guided coupling region of the invention. Unlike short-draw wideband couplers of prior art, the coupling region of long-draw wideband couplers of the invention can be bent through any angle with bend radius of the order of a millimeter without risk of breakage or optical power loss.

Couplers of the invention can therefore be packaged so that the input and output fibers emerge from the same end of the package. After drawing, the output fibers, held in a movable clamp fixture, are rotated around the center of the fused region and made to lie on top of the input fibers. Thus arranged, the fibers are glued to an appropriate substrate and housed in a protective cover. In such an embodiment, the bend angle is 180 angular degrees. Alternatively, other bend angles, e.g., 90 angular degrees or 45 angular degrees, are also envisioned within the scope of the invention. Right angle or acute angle relative directions of input and output leads can have advantages when a coupler must be packaged to conserve space.

To summarize certain important features of the invention, singlemode optical fiber 1×2 couplers featuring predeterminable coupling ratios in the range of 0 to 30% are fabricated using fibers of different diameters fused and drawn beyond the first higher order antisymmetric mode cutoff. Couplers of the invention exhibit excess loss of less than 15% (0.7 dB) unlike couplers drawn beyond antisymmetric mode cutoff using identical fibers which characteristically have about 50% excess loss due to loss of optical power excited in the antisymmetric mode. Two port couplers of the invention provide coupling ratio flatness of +/−1% over a 400 nm wavelength range between 1200 nm and 1600 nm. Star couplers are made using both identical fibers and fibers of different diameters grouped both randomly and in an orderly manner and pulled beyond antisymmetric mode cutoff. Star couplers of the invention exhibit a useful range of coupling ratios which are flat within a few percent over the 1200 to 1600 nm wavelength range. Star couplers of the invention made from identical fibers have relatively lower excess loss than expected when compared to predictions based on identical fiber 1×2 coupler loss beyond antisymmetric mode cutoff. Star couplers of the invention can be made to have 1×4 and 1×8 port configurations. Environmental stability of all couplers of the invention is superior.

The advantages and features of the invention will be discussed further in the detailed description of the preferred embodiments. First, we briefly describe the Figures.

DESCRIPTION OF THE FIGURES

FIG. 1 is a 5 part figure showing two fibers at five points process of making a wideband coupler wherein:

FIG. 2 is a five part figure showing, in magnified scale, cross-sectional views of the fibers illustrated in the various steps shown in FIG. 1 wherein:

FIG. 2a illustrates the cross-sections of the etched fibers at the points indicated as 14 and 15 in FIG. 1a;

FIG. 10a shows a packaged coupler with input and output fibers arranged at right angles.

FIG. 11 is a four part figure that illustrates cross sectional views of the coupling region prior to fusion of 4 embodiments each coupling more than two fibers.

DETAILED DESCRIPTION OF PREFERRED EMBODIMENTS

Figure 1A:
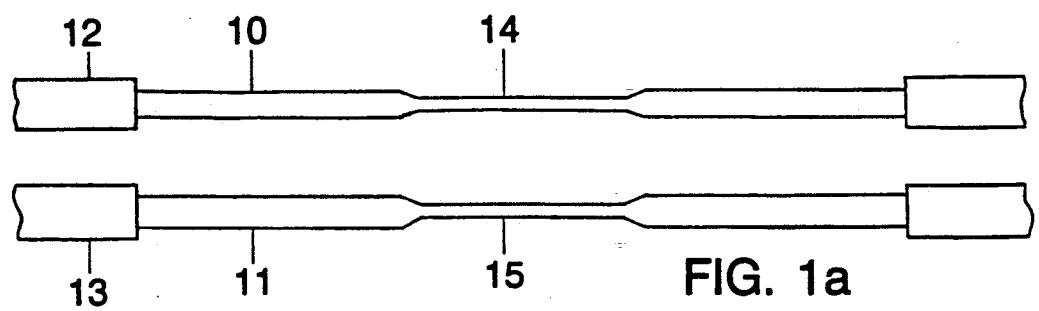
FIG. 1a shows two etched fibers placed side by side.
Figure 1B:
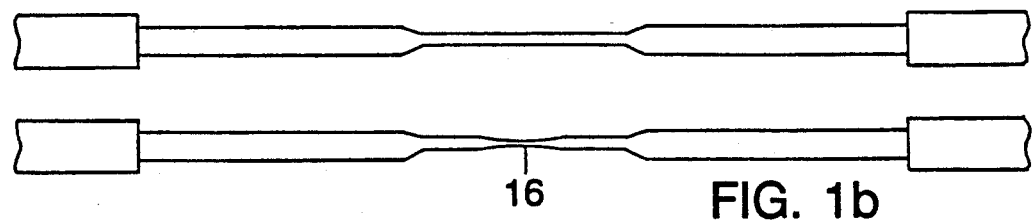
FIG. 1b shows two etched fibers as in FIG. 1a wherein one of the etched fibers has been tapered in the etched region.
Figure 1C:
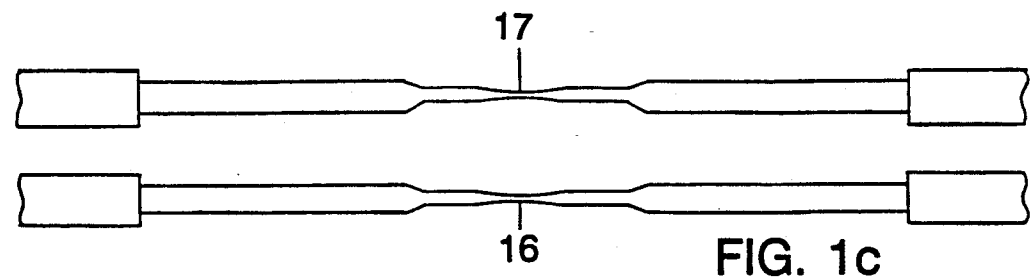
FIG. 1c shows two fibers as in FIG. 1a wherein both fibers have been tapered, but in different amounts in the etched regions.

The steps of fabricating a preferred embodiment of the invention are shown in FIGS. 1a though 1e. FIG. 1a shows two identical singlemode optical fibers 10, 11 from which, over a portion of length, the protective jacket 12, 13 has been removed and which have been subsequently etched in regions 14, 15 to provide sections of constant, reduced thickness. The fibers may for instance be standard singlemode depressed clad fibers available from AT&T, with a portion of the outer clad etched away. One of the fibers is then separately heated and drawn by means familiar to one skilled in the art as shown in FIG. 1b, or both of the fibers are separately heated and drawn different amounts thus forming tapered regions 16, 17 shown in FIG. 1c. The tapered regions 16 and 17 have different diameters. In each case therefore the fibers are different in a characteristic that, as understood by those familiar with the physics of such systems, limits the amount the antisymmetric propagation mode will be excited in the resulting coupler.

Figure 1D:
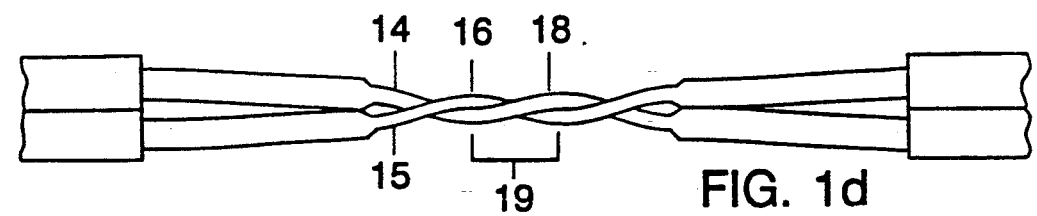
FIG. 1d shows two fibers of different diameters wrap around each other to ensure contact; and, FIG. 1e shows two fibers as in FIG. 1d elongated after an extended fusion draw.
Figure 1E:
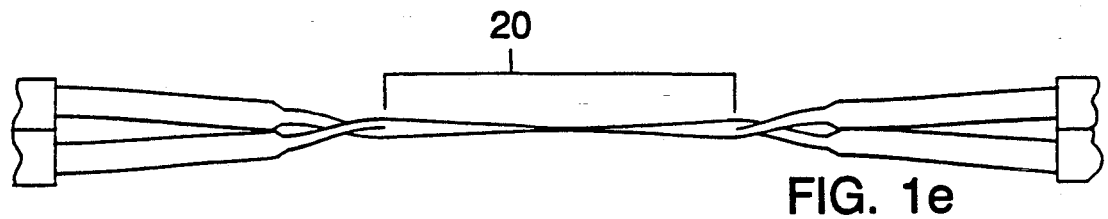
Figure 2A:
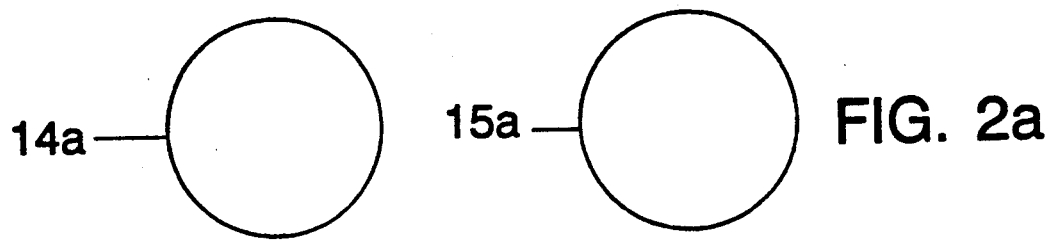
Figure 2B:
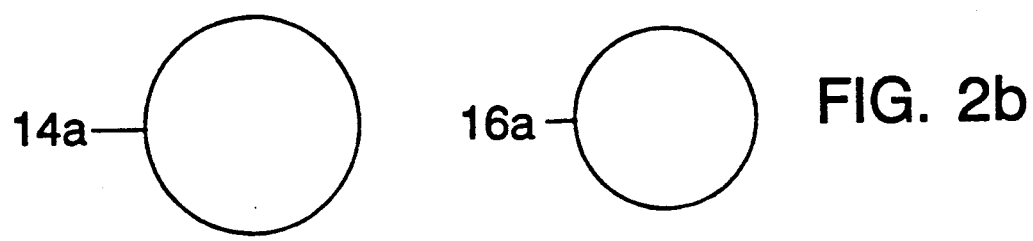
FIG. 2b shows shows the cross-section at the center of the tapered region 16 shown in FIG. 1b.
Figure 2C:
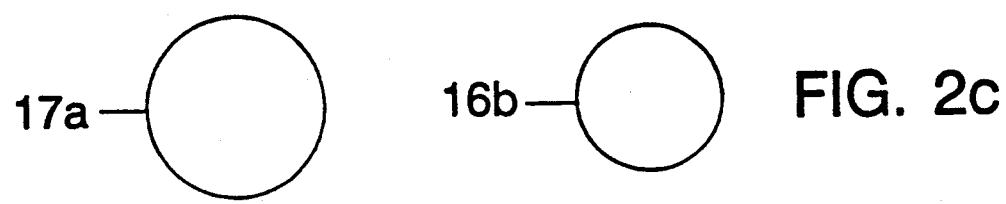
FIG. 2c shows the cross-sections of the two tapered fibers shown in FIG. 1c.
Figure 2D:
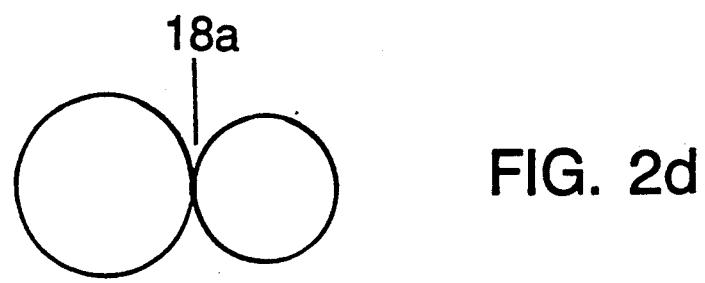
FIG. 2d shows the cross-section as it might appear at any point in the region of contact 18 shown in FIG. 1d; and, FIG. 2e shows the cross-section of a fused fiber pair within the elongated region shown in FIG. 1e.
Figure 2E:

The fibers, e.g., as depicted in FIG. 1b are then wrapped around each other creating a region of contact 18 shown generally in FIG. 1d and both are placed in a drawing apparatus not shown. A stationary heat source is then applied to the region of contact and the drawing apparatus is activated so as to elongate the heated region indicated as 19 in FIG. 1d. During drawing, light of a selected wavelength can be passed through of the fibers and the coupling ratio can be monitored by sensing the excitation in both fibers. The coupling ratio is observed to oscillate as drawing proceeds. After the coupler is drawn through many coupling ratio cycles (overdrawn) the coupling ratio is observed to stabilize, attributable to cutoff of the antisymmetric mode, i.e., the coupler begins behaving essentially like a single fiber, guiding substantially only the symmetric mode. The resulting fused tapered structure is diagrammatically illustrated as 20 of FIG. 1e. In this operation heat may be applied at the center of the contacting region or may be offset substantially from the center. The drawing stages may be made to move apart at substantially the same speed or at different speeds. The reduced diameter fibers may be aligned so that the smallest diameter of one fiber contacts the smallest diameter of the second fiber, or the smallest diameter regions may be offset substantially. Location of the heat source, relation of drawing speeds, and longitudinal alignment of tapered regions have predeterminable effects on the final coupling ratio and wavelength stability.

FIG. 2 shows cross-sectional views of the fibers illustrated in the various steps shown in FIG. 1. The cross-sections of the etched fibers at the points indicated as 14 and 15 in FIG. 1 are shown in FIG. 2a as 14a and 15a respectively. FIG. 2b shows the cross-section 16a at the center of the tapered region 16 shown in FIG. 1b compared to the cross-section 14a of the untapered fiber 14 of FIG. 1. In FIG. 2c are shown the cross-sections 17a and 16b of the two tapered fibers shown in FIG. 1c. FIG. 2d shows the cross-section 18a as it might appear at any point in the region of contact 18 shown in FIG. 1d. Finally, FIG. 2e shows the cross-section 20a of the fused fiber pair within the elongated region 20 shown in FIG. 1e.

The method of predetermining the tapered fiber diameter prior to fusion comprises drawing the etched or unetched fiber or fibers a certain distance. In the case of an unetched fiber, the original diameter of the fiber is known to high accuracies. Etched fibers can be produced with very highly repeatable etched diameters by careful control of the etching conditions. Therefore, with either etched or unetched fibers, the diameter before pre-tapering is known. Secondly, by empirical observation using a controlled heat source, data is tabulated relating the length of the pre-taper draw to the final coupling ratio achieved for a variety of fiber pre-taper lengths. Generally, for the purposes of the invention, the pre-taper length is considered to be the distance the fiber is elongated in the diameter reduction step. This value can be read with 1 micron resolution from several commercially available translation stage controllers. There is a fixed relationship between the elongation distance, the starting diameter, and the final diameter of the elongated fiber. The final coupling ratio obtained by using a specifically elongated fiber is useful in a controlled manufacturing operation. Consequently, a set of pre-fusion taper draw lengths are collected and used thereafter to control the final coupling ratio as exemplified in Table 1.

TABLE 1

| Final coupling ratio as a result of pre-fusion taper draw length. | |
|---|---|
| Pre-fusion-Taper Draw Length (um) | Final Coupling Ratio (%) |
| 960 | 1.2 |
| 900 | 4.8 |
| 640 | 11.8 |
| 400 | 20.2 |

Figure 3:
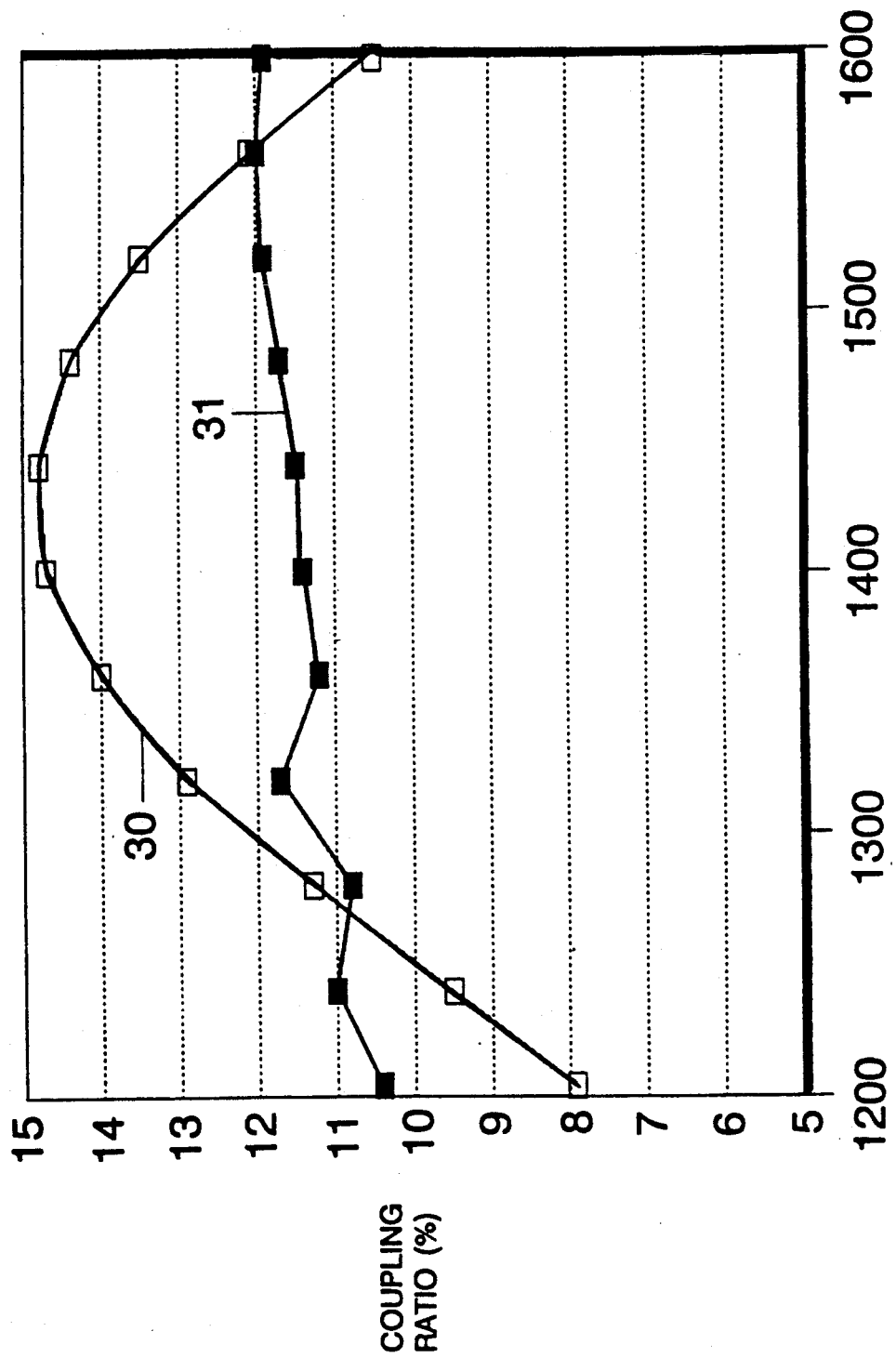
FIG. 3 a graphical presentation of data comparing the coupling ratio wavelength response of a typical short-draw Delta-B wideband coupler shown by the curve intersecting the white blocks, to the wavelength response of a coupler of the invention, shown by the curve intersecting the black blocks. Coupling ratio in percent is shown on the vertical axis. Wavelength is shown on the horizontal axis.
Figure 4:
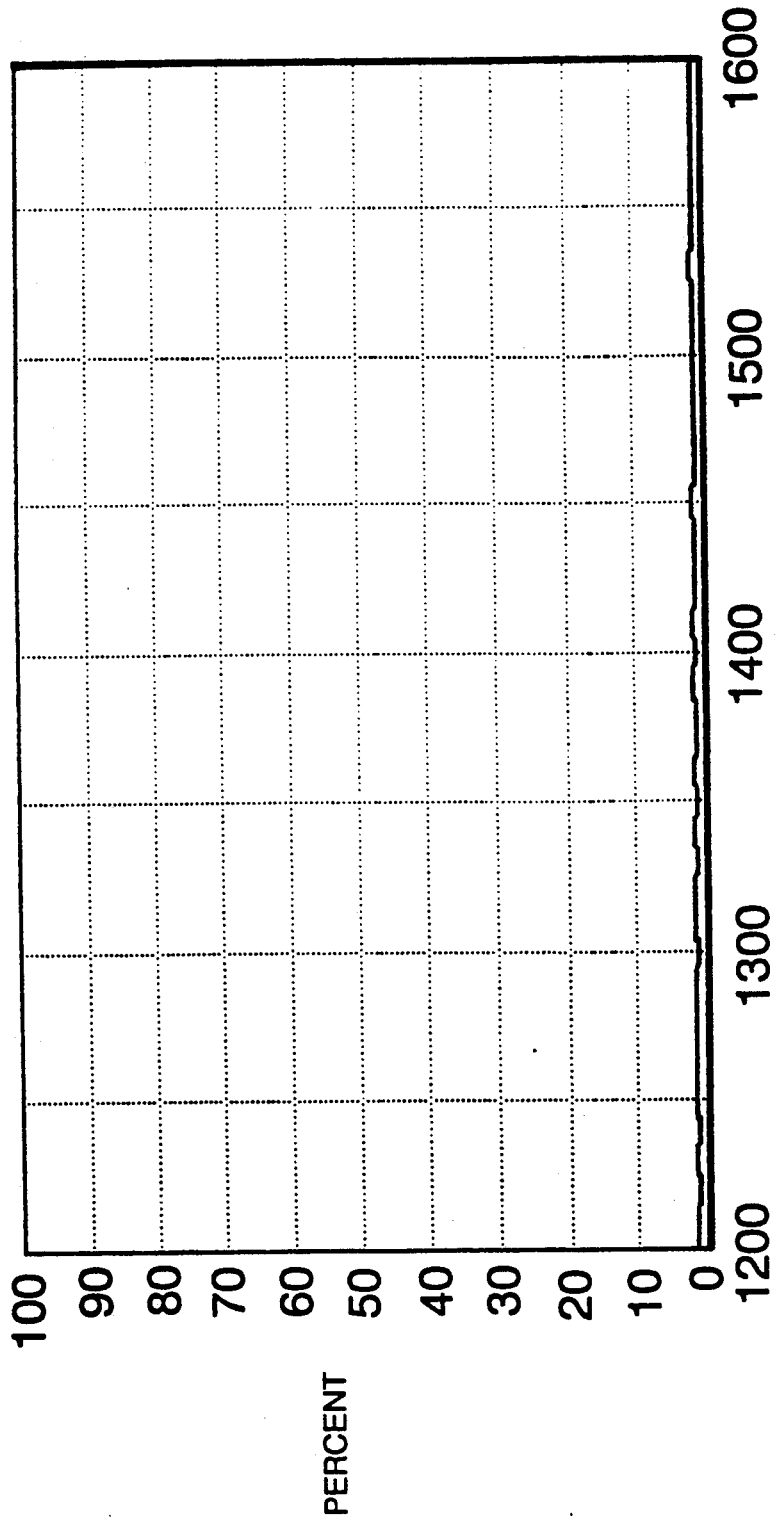
FIG. 4 is a graphical presentation of data showing the coupling ratio on the vertical axis versus wavelength on the horizontal axis of a 1.2% wideband coupler of the invention.
Figure 5:
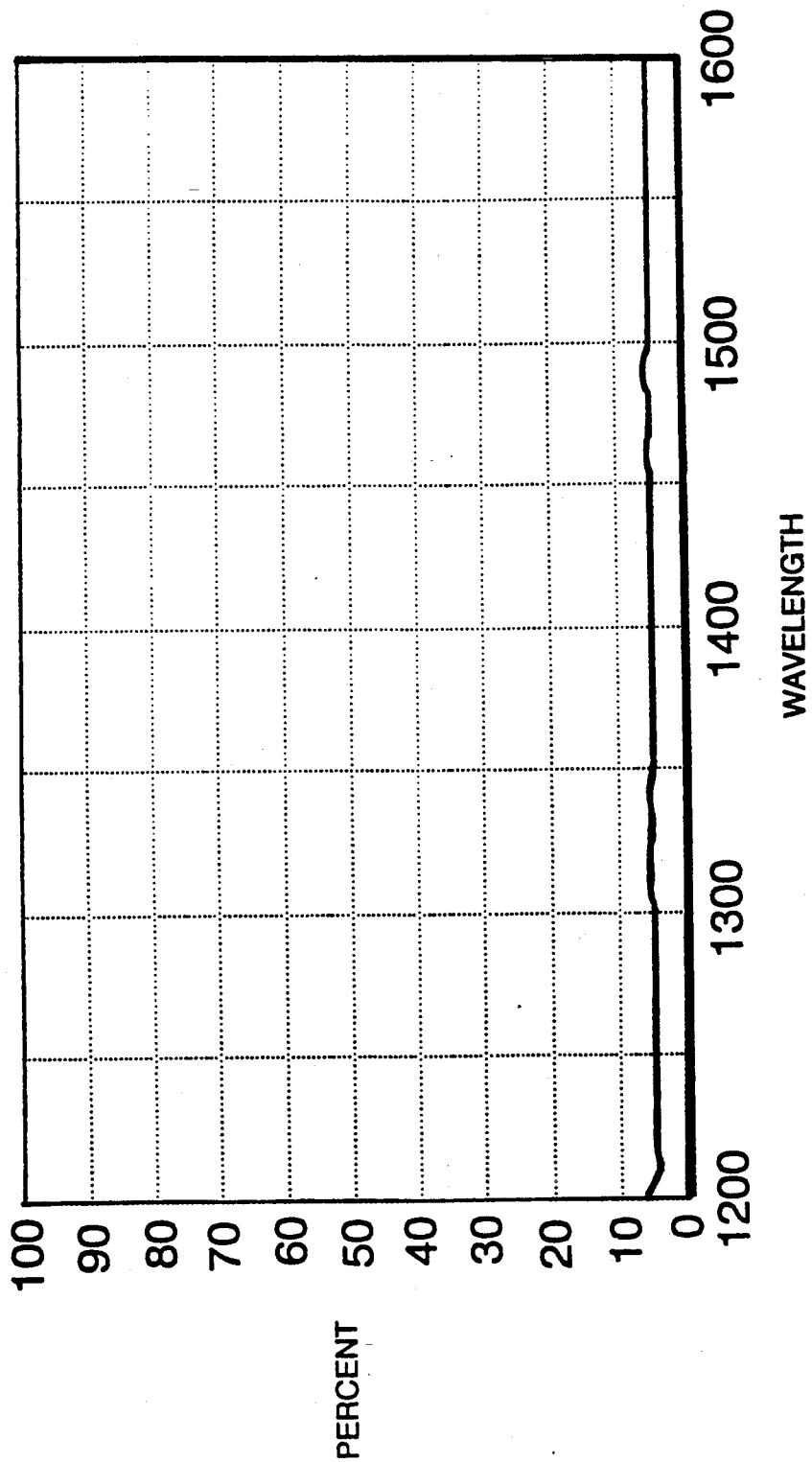
FIG. 5 a graphical presentation of data showing the on the vertical axis versus wavelength on axis of a 4.8% wideband coupler of the invention.
Figure 6:
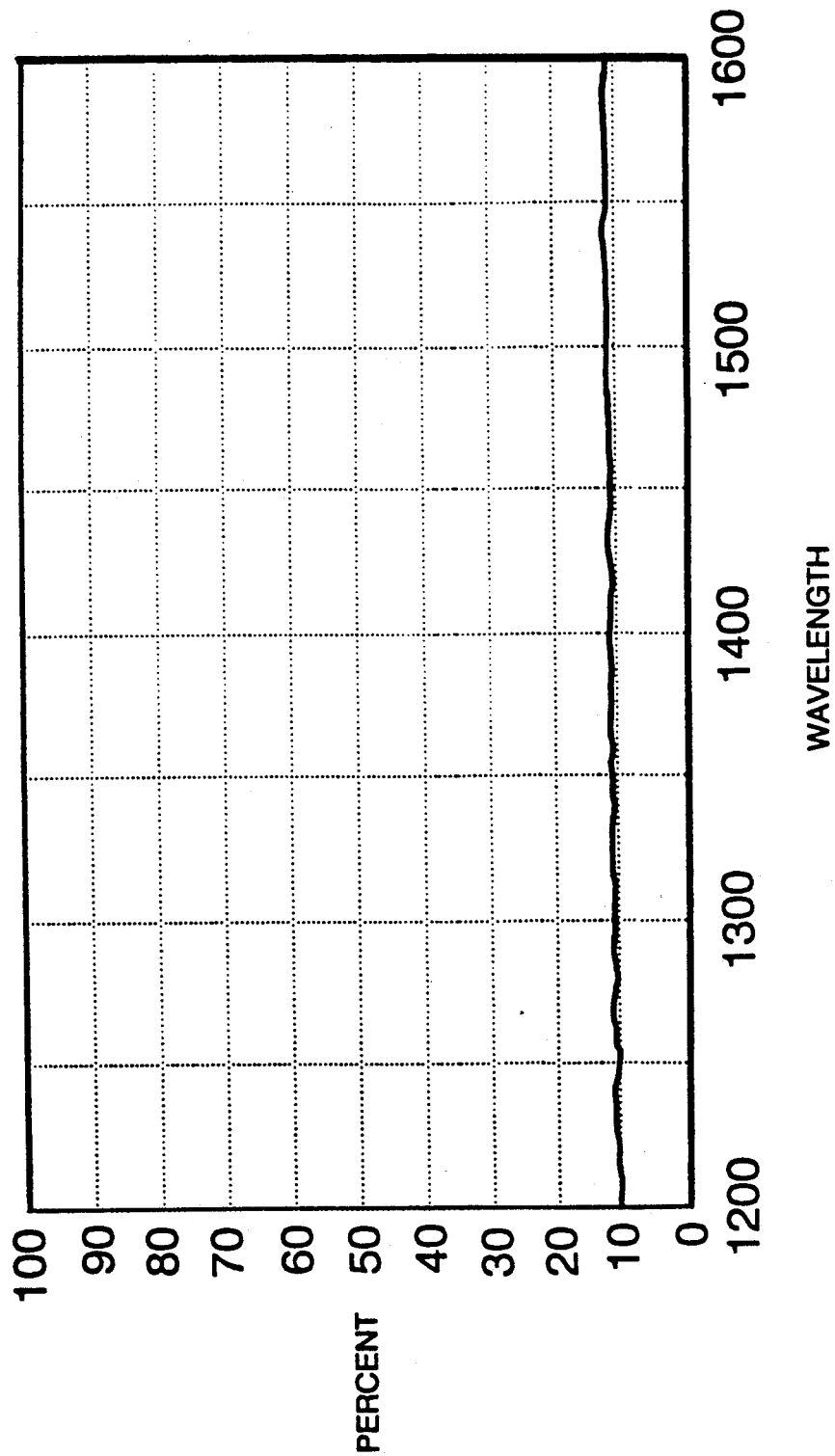
FIG. 6 is a graphical presentation of data showing the coupling ratio on the vertical axis versus wavelength on the horizontal axis of an 11.8% wideband coupler of the invention.
Figure 7:
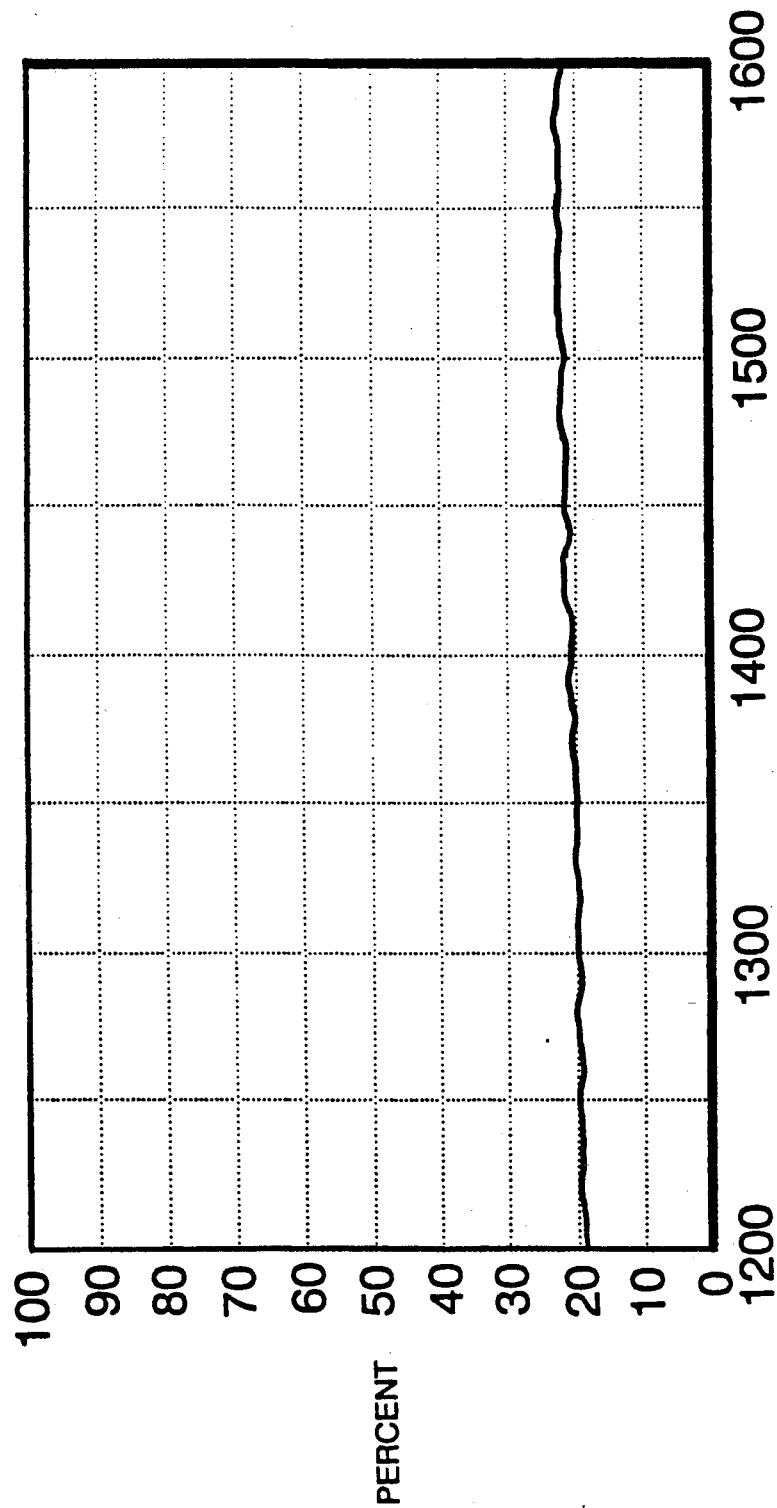
FIG. 7 is a graphical presentation of data showing the ratio on the vertical axis versus wavelength on the horizontal axis of a 20.2% wideband coupler of the invention.

FIG. 3 compares the wavelength response of a typical short-draw Delta-B wideband coupler of prior art shown by the curve 30 intersecting the white blocks, to the wavelength response of a coupler of the invention, shown by the curve 31 intersecting the black blocks. Over the 1200 to 1600 nm optical bandwidth indicated on the horizontal axis, the prior art Delta B wideband coupler has coupling ratio, indicated on the vertical axis, of about 11.4+/−3.5 percent. Over the same wavelength range, the coupler of the invention is seen to have a coupling ratio of 11.2+/−0.8 percent. Here, the coupler of the invention was made using a pre-draw taper of 640 um according to Table 1.

Further, the wavelength response of four other typical couplers drawn according the empirical pre-fusion draw lengths given in Table 1 above are shown in FIGS. 4 through 7. The coupler of FIG. 4, e.g., was made using two fibers etched to a diameter of 40 um. One of the fibers was subsequently drawn 960 um prior to fusion. The fusion draw was continued, as explained herein above, until the coupling ratio became stable at the value of about 1.2 percent shown in FIG. 4. Similarly, the coupler wavelength responses shown in FIGS. 5, 6, and 7 relate to couplers made from fibers etched to 40 um, one each of which was drawn respectively 900, 640, and 400 um. Table 2 summarizes the average coupling ratio and excess loss of each of these 4 typical couplers of the invention.

TABLE 2

| Figure Number | Pre-fusion Draw Length | Average coupling ratio | Excess Loss |
|---|---|---|---|
| 4 | 960 um | 1.2% | 0.30% |

TABLE 2-continued

| Figure Number | Pre-fusion Draw Length | Average coupling ratio | Excess Loss |
| --- | --- | --- | --- |
| 5 | 900 um | 4.8% | 0.64% |
| 6 | 640 um | 11.8% | 0.62% |
| 7 | 400 um | 20.2% | 0.70% |
| 8 (prior art) | 0 um | 48.0% | 55.30% |

Figure 8:
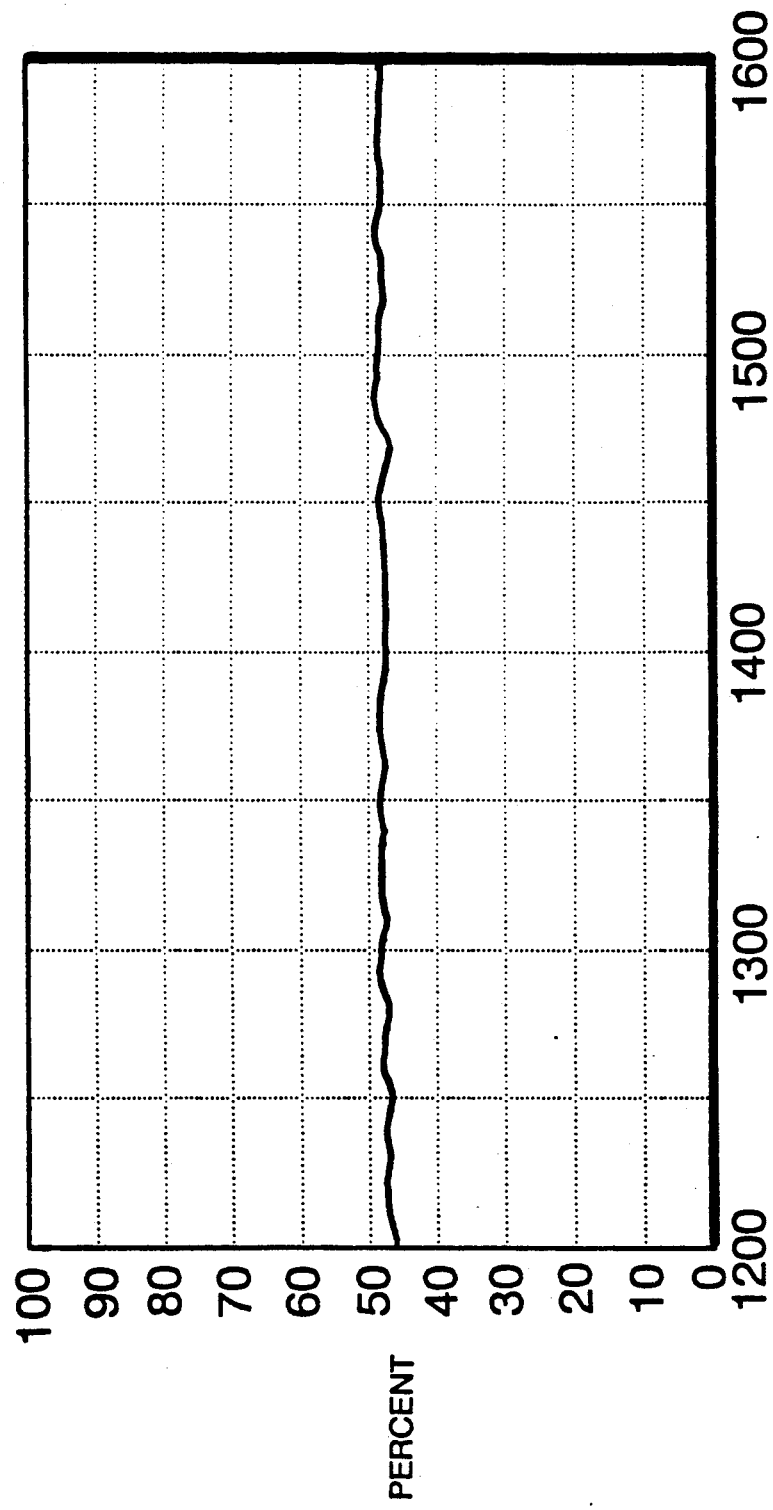
FIG. 8 is a graphical presentation, for a prior art coupler, of the coupling ratio on the vertical axis versus wavelength on the horizontal axis of a 48% wideband coupler.

Also listed in Table 2 are the parameters of the prior art coupler shown in FIG. 8. The coupler of FIG. 8 was made of etched fibers that were not subject to a pre-fusion draw, i.e., the fibers used to make that nominally 48% coupler were of substantially identical diameters, with identical propagation constants, in this way being similar to the fibers used in the prior art experiment of Bilodeau, et al., cited above. The extended drawing technique was used. In Table 2, it is of particular interest to note the distinctions between the couplers made according to the invention and the coupler of FIG. 8 made by extended drawing of identical fibers. First, the couplers made according to the invention have predeterminable coupling ratios substantially below 50 percent. The coupler of FIG. 8, drawn from identical fibers has coupling ratio near 50%. Second, couplers made according to the invention have acceptably low excess loss for most practical applications. A coupler made from identical fibers, as expected, has about 50% excess loss, which for most applications is not practical.

In terms of bandwidth, it can be seen by comparing the data of FIG. 8 to the data of FIGS. 4 through 7, that couplers made using an extended draw characteristically have very flat wavelength response. The invention therefore obtains the advantages of flat wavelength response obtained by the extended draw technique, while limiting excess loss to practical levels and with the ability to pre-select final coupling ratio obtained by using fibers of different diameters.

The favorable excess loss characteristics of the couplers made according to the present invention are attributed to the fact that, by starting with fibers having preselected, different propagation constants, achieved here by differing diameters, the amount of excitation in the first antisymmetric higher order mode is kept substantially below 50% and indeed preferably below 30%, and in many instances far below that. Therefore, when the coupler is "overdrawn" to the point where the antisymmetric mode is cut off, only the limited energy in the asymmetric mode is lost, while the predominant portion of the energy is preserved, thus enabling a coupler with practically acceptable loss characteristics to be realized. Although the wideband phenomenon observed in the prior art experiment reported above and illustrated in FIG. 8 did not produce coupler of general practicality, the novel combination of limiting the energization of the antisymmetric mode with the long or overdrawn technique just described can lead to a wide variety of practical couplers.

Figure 9:
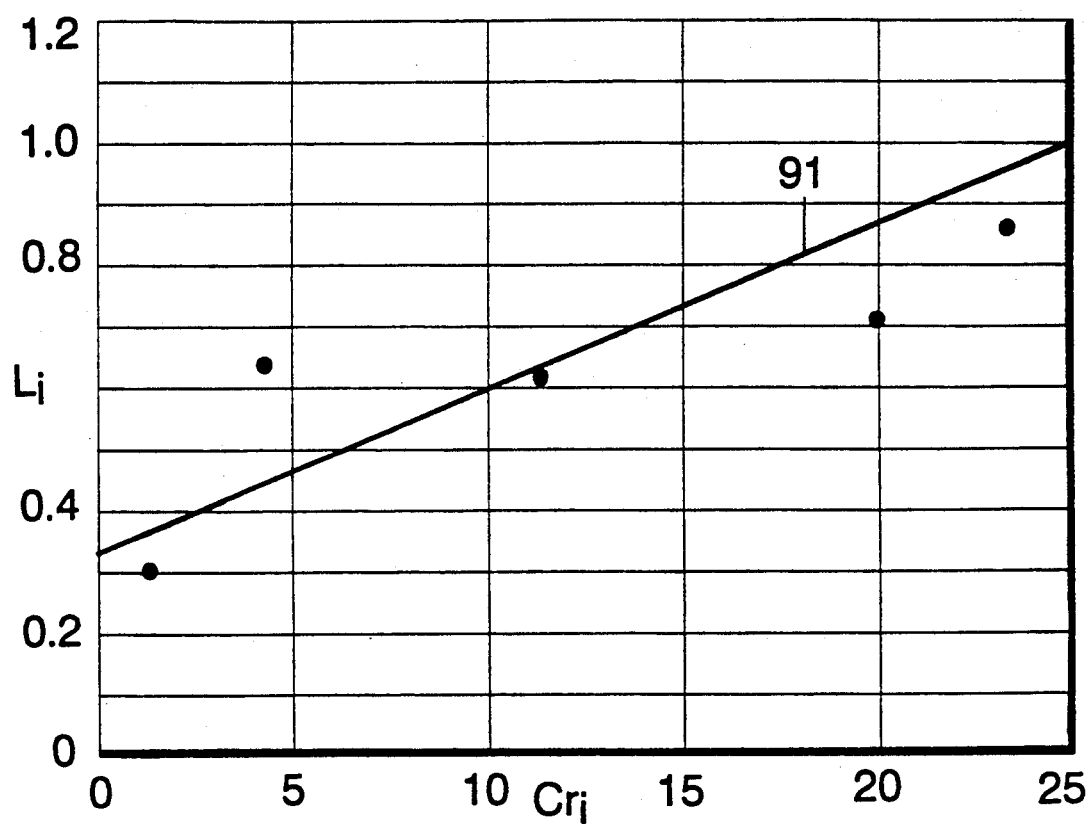
FIG. 9 is a graphical presentation of data showing the excess loss in dB, on the vertical axis, versus coupling ratio, on the horizontal axis, as measured in couplers of the invention shown by the black circles with the trend shown by the black line.

According further to the invention a direct relationship between the coupling ratio and the excess loss in couplers of the invention has been realized by the invention. FIG. 9 shows an excess loss curve with excess loss Li expressed in dB indicated on the vertical axis of FIG. 9, versus coupling ratio Cri indicated on the horizontal axis. The black circles plot the average measured excess losses from couplers of the invention and the line 91 shows the trend. Excess loss decreases with decreasing coupling ratio and decrease in excitation of the antisymmetric mode in couplers made according to the invention.

The trend observed here shows that couplers of the invention having low coupling ratio, for use, e.g., in tapped bus distribution systems, can reliably be made to have low excess loss in addition to environmental stability and truly wideband coupling response.

While it is presently preferred to form the fibers by fusing and drawing to provide different propagation constants thus to vary the coupling ratio and limit the excitation of the asymmetric mode, other approaches to limiting the excitation as mentioned above may also be used to like effect, the importance being to limit the energy loss at the end of the long draw, when the so-called cut-off of the asymmetric mode is reached.

It is possible according to the invention to achieve coupling ratios as high as 30% with excess losses less than 2 dB. Such couplers may find practical utility in applications where there is a relatively large amount of light energy available, where a tap with extremely stable coupling characteristics is desired. An example is the use of a powerful laser diode in a context where it is desired to split the light at an assured constant ratio despite variations in polarization or wavelength.

With couplers having more restricted coupling ratios, excess loss of less than 1.5 dB can be obtained. Such couplers are suitable for systems e.g., employing lower power lasers as the light source, where the power budgets are tighter.

Indeed the invention makes possible low coupling ratio splitters and couplers with excess loss less than 1 dB, that can find practical applications in feedback systems where a small amount of power is fed back to control a highly stabilized light source.

Figure 10A:
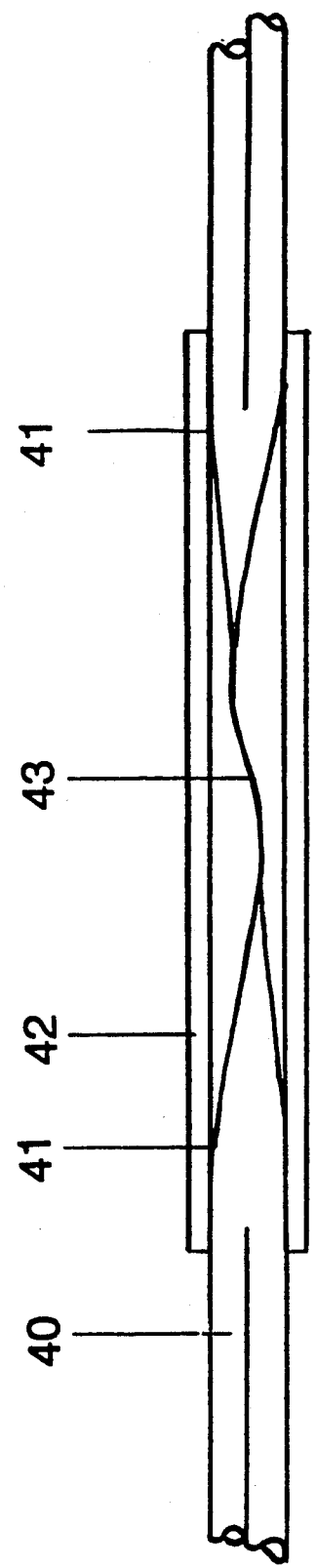
FIG. 10a schematically illustrates mounting a coupler to a substrate in a manner to relieve stress from the coupling region.

Since the coupling region in couplers of the invention is drawn to extended length, the diameter of the fused coupling region, indicated in cross section, e.g., by 20a in FIG. 2, has cross sectional dimensions in the range of a few microns. This thin coupling region can be bent without affecting the optical properties of the coupler. The fused coupling region may be secured to a substrate with constituent fibers thereof in essentially tension relaxed condition. This manner of mounting is illustrated schematically in FIG. 10a. Two fibers 40 are fused and drawn according to the methods described herein and are then attached, e.g., by adhesive applied to regions denoted 41 in FIG. 10a, to a substrate 42. Prior to rigid attachment, tension in the fibers is relaxed so that a bent region 43 occurs in the thin coupling region. Since fibers so mounted are not tensioned, less mechanical stress occurs in the delicate coupling region thus reducing the likelihood of breakage after packaging. A two fiber coupler of the first aspect of the invention is illustrated in FIG. 10a.

Figure 10B:
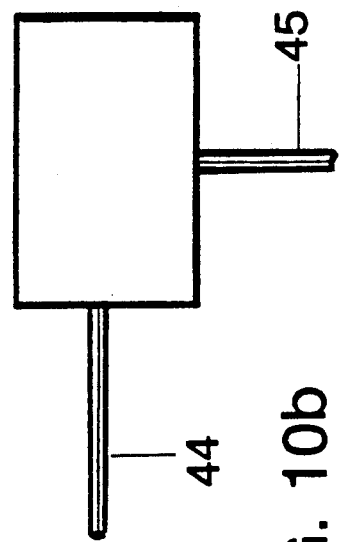
FIG. 10 is a two part figure.

The concept of bending a coupling region extends easily to mountings wherein the input fibers, e.g., 44 of FIG. 10b and output fibers, e.g., 45 of FIG. 10b, are attached at substantial angles relatively. Such packaging advantageously provides design versatility when couplers are subsequently designed into a mechanical assembly. A packaged coupler providing a right angle relationship between input and output fibers is illustrated schematically in FIG. 10b. Clearly any angle in the range of 0 to 180 degrees can be provided by advantage of the invention. Couplers made of three or more fibers in accordance with the second aspect of the invention can be mounted in the same way with similar advantages.

Figure 11A:
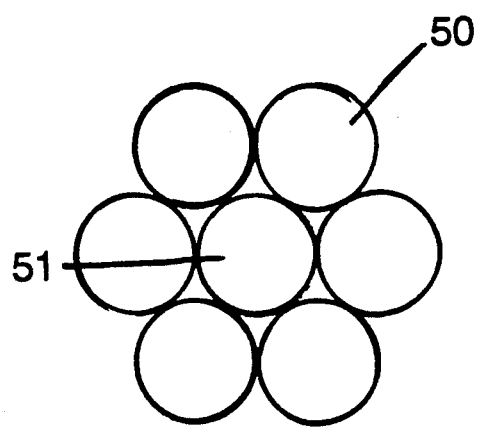
FIG. 11a illustrates seven fibers of the same diameter wherein six fibers are disposed in a radially symmetric, azimuthally periodic manner around a central fiber.
Figure 11B:
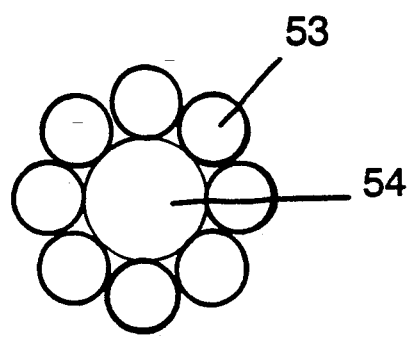
FIG. 11b illustrates the cross section of a coupling region as it might appear before fusion wherein eight fibers are disposed in an orderly manner about a central fiber of larger diameter.
Figure 11C:
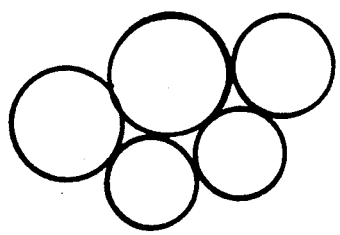
FIG. 11c illustrates five fibers of different diameter grouped in a random manner.
Figure 11D:
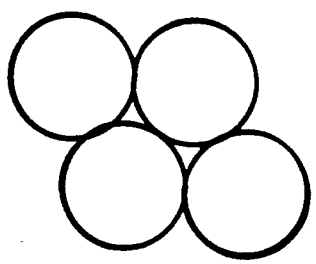
FIG. 11d shows 4 fibers of the same diameter grouped in a random manner.

We now turn to describe embodiments according to the second aspect of the invention. FIG. 11 illustrates cross sectional views of the coupling region prior to fusion of four embodiments each coupling more than two fibers. FIG. 11a illustrates seven fibers of the same diameter wherein six fibers 50, are disposed in a radially symmetric, azimuthally periodic manner around a central fiber 51. This is an orderly grouping of fibers of the same diameter. FIG. 11b illustrates the cross section of a coupling region as it might appear before fusion wherein eight fibers 53 are disposed in an orderly manner about a central fiber 54 of larger diameter. FIG. 11c illustrates five fibers of different diameter grouped in a random manner. FIG. 11d shows 4 fibers of the same diameter grouped in a random manner.

Couplers having more than two output ports can, in general, be made to distribute light into each output fiber in inverse proportion to the number of coupled fibers. I.e., if a coupler is made with N fibers fused and elongated, and if optical power P is launched into one of the N fibers, then, neglecting excess loss, each of the N output fibers can be made to carry optical power substantially equal to P/N. Therefore, the coupling ratio decreases as the number N of fibers coupled increases. For couplers made in accordance with broad aspects of the present invention, the excess loss decreases as the coupling ratio decreases. Here we discuss an embodiment of the invention having a large number of fibers coupled, which has small coupling ratios at each output and small excess loss.

Figure 12:
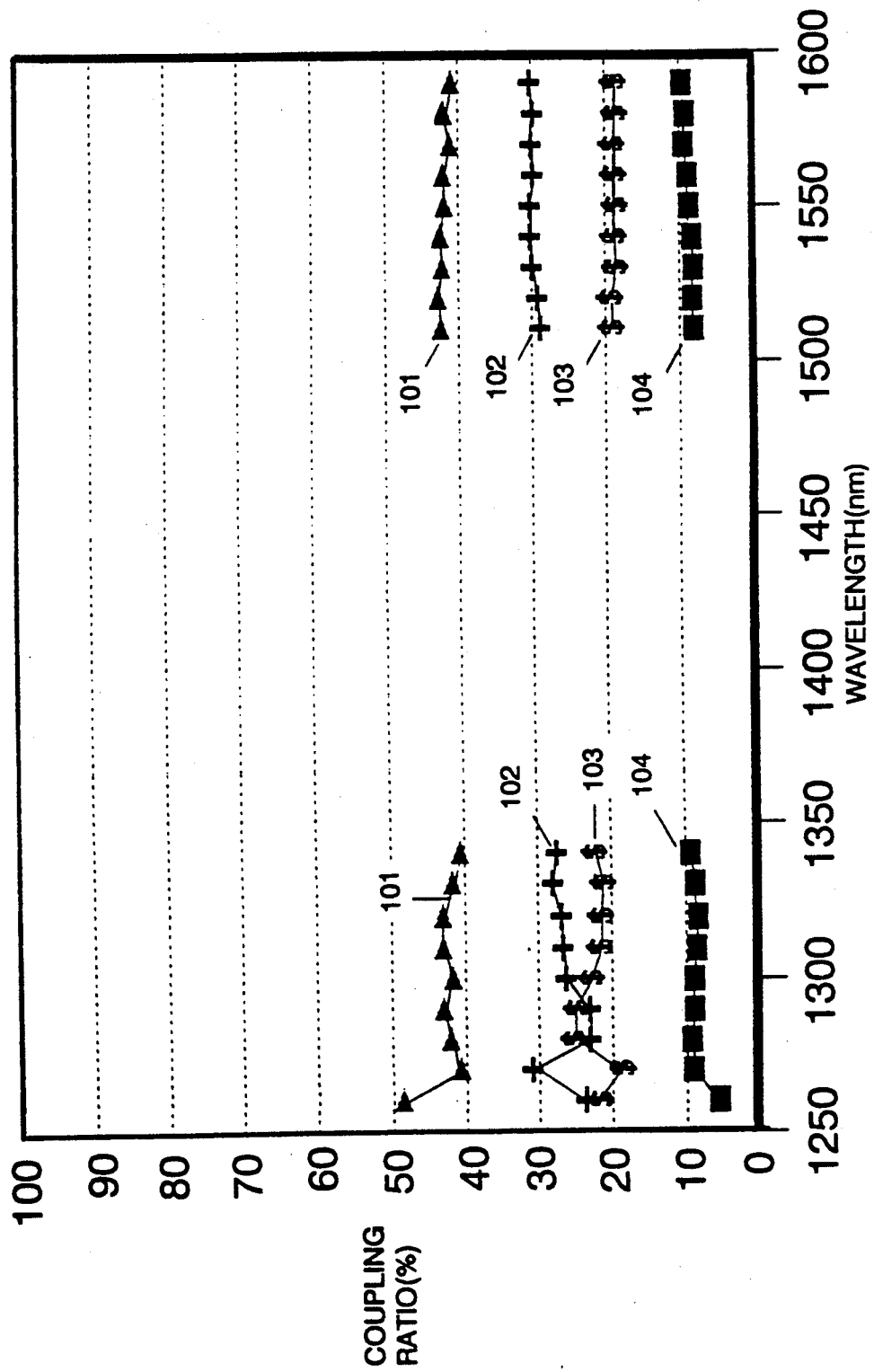
FIG. 12 is a graphical presentation of data showing the on the vertical axis versus wavelength horizontal axis of a 1×4, 10%, 20%, 30%, 40% wideband star coupler of the invention.

FIG. 12 shows wideband coupling ratio wavelength response of an experimental 4×4 coupler of the invention, made using the long-draw techniques that have been described. The diameters of all four fibers were equal. Prior to fusion the fibers were arranged substantially as shown in FIG. 11d. Coupling ratios were measured around 1300 and 1550 nm. It can be seen that the coupling ratios to each of the four outputs are essentially 10%, 20%, 30%, and 40% as shown by the lines labelled 101, 102, 103, and 104. This coupler demonstrated an average excess loss of about 33%. Long-draw couplers are expected to have 50% excess loss. The data of FIG. 12 indicate that the construction and arrangement of the multiple fibers here also limits the excitation of antisymmetric mode power with resultant favorable excess loss characteristics (substantially less than 50% excess loss).

Similar results have been obtained with an 8×8 fiber long-draw star coupler made according to the invention. Following these teachings, low-cost wideband couplers can be produced with excess loss less than 10% with an attractive range of coupling ratios. For example, since the coupling to each output fiber in a star coupler of the invention depends upon which fiber is used as the input, by selecting different fibers for the input, different families of coupling ratio can therefore be obtained from the same device.

By advantage of the invention, therefore, the system designer can now tailor the distribution of input power according to the actual system requirements. While a random arrangement of fibers is permitted by advantage of the second aspect of the invention, i.e., involving three or more fibers, an orderly arrangement of fibers, e.g., a radially periodic placement of surrounding fibers around a central fiber, as in FIGS. 11a or 11b will result in greater uniformity and, if the diameters of fibers are different, as in FIGS. 11b and 11c, improved excess loss performance. Both random and ordered arrangements of fibers with equal or unequal diameters are within the scope of the second aspect of the invention.

By advantage of the second aspect of the invention, a 1×N coupler has very flat wavelength response, a convenient range of coupling ratios, acceptable excess loss, virtual insensitivity to thermal and polarization variations, and can be made economically without necessarily requiring the labor and special fixtures needed to ensure symmetrical fiber placement before fusion.

What is claimed is:

1. A fiber optic coupler for single mode fibers comprised of fibers of differing propagation constants selected to limit the degree of excitation of the antisymmetric mode to a value ranging from 1% to 40% of the light energy, said fibers being laterally fused together and drawn over a length exceeding the antisymmetric cut off, said coupler having substantially constant coupling ratio with excess loss substantially corresponding to the energy excited in the antisymmetric mode.

2. A fiber optic coupler for singlemode fiber as in claim 1 wherein said fused region is of diameter sufficiently small to allow bending in said fused region without affecting the optical characteristics of said coupler.

3. A fiber optic coupler for singlemode fiber as in claim 1 wherein said fused region is bent through an angle.

4. A fiber optic coupler for singlemode fiber as in claim 1 wherein said coupling ratio is substantially independent of temperature over a range of at least −40.0 degrees centigrade to +80.0 degrees centigrade.

5. A fiber optic coupler for singlemode fiber as in claim 1 wherein said coupling ratio is substantially independent of input polarization.

6. A wideband fiber optic coupler for singlemode fibers comprising a thermally fused lateral intersection of two optical fibers of differing diameters forming a drawn, fused tapered coupling region, said coupling region of length much greater than a coupling length and said length of said drawn coupling region and its reduced diameter, being sufficient to ensure cutoff of the antisymmetric mode resulting in a predetermined coupling ratio in the range of 1 to 30 percent, said coupling ratio substantially independent of input optical wavelength over a range of at least 400 nanometers.

7. A method of making a wideband singlemode optical fiber coupler comprising first reducing the diameter of two fibers substantially equal amounts in regions of short length within the continuous extent of both of said fibers and subsequently within a reduced region of one of said fibers further reducing the diameter of one of the fibers a predetermined amount, said predetermined amount being a fraction of the diameter of the first fiber and the ratio of diameters being used to predetermine the final coupling ratio, and wherein the two fibers of differing diameters are arranged to contact each other within the reduced diameter regions and both of said fibers thus in lateral contact are heated and elongated by drawing to form a fused tapered coupling region, said fused tapered region comprising a fused lateral intersection of said fibers of different diameters wherein optical coupling occurs, said drawing being continued through many coupling lengths until the coupling ratio substantially stabilizes at an essentially predetermined value in the range of 1 to 30 percent, said coupling ratio exhibiting substantial insensitivity to input optical wavelength over a range of at least 400 nanometers and wherein said different diameters are achieved by selecting original fibers of different initial diameter.

8. A wideband fiber optic coupler for single-mode fiber comprising a thermally fused lateral intersection of a set of N optical fibers said fibers among said set of N fibers being further divided into at least two subsets each of which said subsets has at least one fiber and each of which said subsets is comprised of fibers of the same diameters but each of said subsets comprising fibers having different diameter from any other subset and all of which said subsets form a fused tapered coupling region said coupling region of length much greater than a coupling length and sufficient to ensure antisymmetric mode cutoff resulting in a predetermined coupling ratio substantially proportional to 1/N where $N>2$ and said coupling ratio is substantially independent of input optical wavelength over a range of at least 400 nm.

9. A method of making a wideband singlemode optical fiber coupler comprising arranging more than two fibers of the same diameter in an orderly organized bundle wherein contact between fibers is radially symmetric and azimuthally periodic within a relatively short region within the continuous extent of said fibers, wherein all of said fibers are then heated in the region of lateral contact and elongated by drawing forming a fused tapered coupling region said drawing being continued through many coupling lengths until the coupling ratio substantially stabilizes at an essentially predetermined value in the range of 1 to about 40 percent said coupling ratio exhibiting substantial insensitivity to input optical wavelength over a range of at least 400 nanometers.

10. A method as in claim 9 wherein the fused coupling region is of sufficiently small diameter that it may be bent without affecting the optical properties of said coupler and wherein tension is applied during drawing and is removed from the fused length and the region is slackened prior to packaging.

11. A method as in claim 9 wherein said contact between said fibers is caused by twisting said fibers around each other.

12. A method of making a wideband singlemode optical fiber coupler comprising grouping more than two fibers of differing diameters in an orderly organized bundle wherein contact between fibers is radially symmetric and azimuthally periodic within a relatively short region within the continuous extent of said fibers wherein said fibers are then heated in the region of lateral contact and elongated by drawing forming a fused tapered coupling region said drawing being continued through many coupling lengths until the coupling ratio substantially stabilizes at an essentially predetermined value in the range of 1 to about 40 percent said coupling ratio exhibiting substantial insensitivity to input optical wavelength over a range of at least 400 nanometers.

13. A method of making a wideband singlemode optical fiber coupler comprising arranging more than two fibers of the same diameter in a randomly organized bundle wherein contact between fibers is radially asymmetric and azimuthally aperiodic within a relatively short region within the continuous extent of said fibers wherein all said fibers are then heated in the region of lateral contact and elongated by drawing forming a fused tapered coupling region said drawing being continued through many coupling lengths until the coupling ratio substantially stabilizes at an essentially predetermined value in the range of 1 to about 40 percent said coupling ratio exhibiting substantial insensitivity to input optical wavelength over a range of at least 400 nanometers.

14. A method of making a wideband singlemode optical fiber coupler comprising grouping more than two fibers of differing diameters in a randomly organized bundle wherein contact between fibers is radially asymmetric and azimuthally aperiodic within a relatively short region within the continuous extent of said fibers wherein said fibers are then heated in the region of lateral contact and elongated by drawing forming a fused tapered coupling region said drawing being continued through many coupling lengths until the coupling ratio substantially stabilizes at an essentially predetermined value in the range of 1 to about 40 percent said coupling ratio exhibiting substantial insensitivity to input optical wavelength over a range of at least 400 nanometers.

15. A fiber optic coupler formed of at least two single mode optical fibers, at least one of which is an input fiber, the fibers constructed and arranged in the manner that coupling between the input fiber and the other fibers limits antisymmetric model energy to a value ranging from 1% to 40% of the input energy, the coupling region of said coupler being fused and drawn to an extended length sufficient to cause cutoff of the antisymmetric mode energy, whereby the coupler exhibits coupling ratio stability over an extended range of wavelengths and an excess loss corresponding to the energy excited in the antisymmetric mode and wherein the fused coupling region is of sufficiently small diameter that it may be bent without affecting the optical properties of said coupler and wherein said fused coupling region is secured to a substrate with constituent fibers thereof in essentially tension relaxed condition.

16. A wideband fiber optic coupler for singlemode fiber comprising a thermally fused lateral intersection of N optical fibers of the same diameter forming a fused tapered coupling region said coupling region of length much greater than a coupling length and sufficient to ensure antisymmetric mode cutoff resulting in a predetermined coupling ratio substantially proportional to 1/N where $N>2$ and said coupling ratio is substantially independent of input optical wavelength over a range of at least 400 nm and wherein said coupling ratio is substantially independent of input polarization.

* * * * *

UNITED STATES PATENT AND TRADEMARK OFFICE
CERTIFICATE OF CORRECTION

PATENT NO.  : 5,195,151

DATED       : March 16, 1993

INVENTOR(S) : Daniel R. Campbell, Jr., et al.

It is certified that error appears in the above-identified patent and that said Letters Patent is hereby corrected as shown below:

Col. 1, line 18; insert -- . -- after "equipment";

Col. 4, lines 34, 39; "reguirements" should be --requirements--;

Col. 10, line 28; insert --the horizontal-- after "wavelength on";
    line 50; "Fig. 10a" should be --Fig. 10b--;
    line 68; insert --coupling ratio-- after "the" (first occurrence)
    line 68; insert --on the-- after "wavelength".

Signed and Sealed this

Fifth Day of April, 1994

*Attest:*

BRUCE LEHMAN

*Attesting Officer*     Commissioner of Patents and Trademarks